Aug. 21, 1962 E. C. MILLER ET AL 3,049,964
OPTICAL OIL CHANGE INDICATOR
Filed Aug. 10, 1959

INVENTORS
E.C. MILLER
F.W. KARASEK
BY Hudson & Young
ATTORNEYS

United States Patent Office 3,049,964
Patented Aug. 21, 1962

3,049,964
OPTICAL OIL CHANGE INDICATOR
Elmer C. Miller, Bartlesville, and Francis W. Karasek, Dewey, Okla., assignors to Phillips Petroleum Company, a corporation of Delaware
Filed Aug. 10, 1959, Ser. No. 832,531
3 Claims. (Cl. 88—14)

This invention relates to means for detecting solid impurities in crank case oil of internal combustion engines. In one aspect it relates to means for estimating the content of carbon and dirt in automotive crank case oil. In another aspect it relates to means for estimating the quality of automotive lubricating oils, as regards solid impurities, as an indication for need of a change of oil.

Prior art has provided apparatus for determination of the content of solid matter in crank case oils based on the absorption of transmitted light by the suspended solid matter in the oil. New oil which does not contain solid matter transmits a maximum amount of light and the presence of solid matter in the oil decreases the light transmission. Prior art apparatus employs a beam of light transmitted through a film of oil for determining its fitness for further use. An important disadvantage in use of transmitted light is the difficulty in obtaining the same thickness of film each time a determination is made. Furthermore, solid matter suspended in oil gives a different intensity of transmitted light than the same oil with its solid matter settled to the bottom of the container. Also, readings are frequently variable, that is, the intensity of transmitted light changes as the oil stands in the apparatus because of the settling of the solid matter. Another disadvantage in the use of light transmission is that sediment which does not settle out can move about, by convection, with the oil and thus result in light transmission determinations which are not constant, or, in other words, variable readings are obtained. Another disadvantage is that detergents or other additives added to the oil may change color with use or when hot over their color in an oil sample used for calibration of the apparatus. These and other disadvantages have appeared in the use of apparatus in which appreciable volumes of oil are used for determination of solid matter in the oil by the transmitted light. The present invention is advantageous over such prior art means because of the use of reflected light on a sample which is not moving and which cannot change during the time observations are being made.

An object of this invention is to provide apparatus for the determination of solid impurities in internal combustion engine crankcase oils as an indication of need for an oil change. Another object is to provide apparatus for estimating the presence of solid impurities in automotive crankcase oils. Another object is to provide an apparatus for the rapid estimation of the presence of solid impurities in crankcase oil, which is simple to manufacture and to use. Yet another object of this invention is to provide such an apparatus which can provide the answer as to whether a crankcase oil needs changing or not while a prospective customer is watching the operation. Yet other objects and advantages will be realized upon reading the following description which, taken with the attached drawing, forms a part of this specification.

Figure 1:
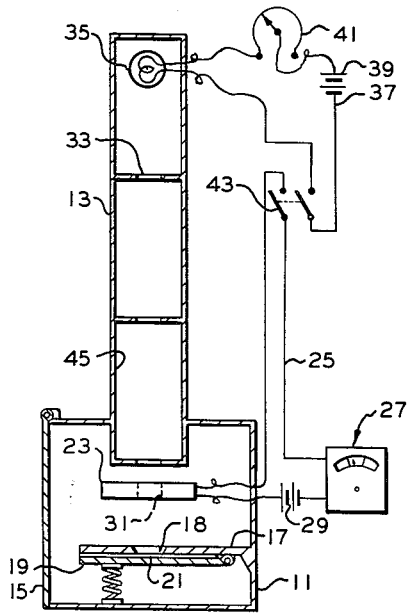
FIGURE 1 illustrates, in diagrammatic form, an elevational view, partly in section, of one form of apparatus of this invention.

In the drawing, reference numeral 11 in FIGURE 1 identifies a housing which is substantially in the form of a box having an extension or column 13 extending outward from one side. The interior surfaces of column 13 and box 11 are blackened at 45 so as to be nonreflective of light. A source of light as, for example, an electric light bulb 35 is provided near the end of column 13, as illustrated. Several partitions with openings 33 are provided for collimating or making substantially parallel light rays from the light bulb 35. In the box 11 is provided a fixed plate 17 having a small opening 18. Mounted immediately below plate 17 is a hinged, spring loaded pressure plate 19. The hinged pressure plate 19 is intended to press a piece of paper 21 tightly against the underside of plate 17 when the apparatus is in use. A spring loaded hinged door 15 is provided for access to the interior of box 11. A photoelectric cell 23, which is constructed as an annulus having an opening 31 in its center, is mounted as illustrated. This mounting is such that the collimated light beam from bulb 35, directed through opening 31, falls on paper 21 below opening 18. Light reflected by the paper through opening 18 is transmitted to the photoelectric cell. A meter 27, which may be a milliammeter, is included in an electrical circuit 25 for indication of the amount of current flowing through the circuit, as caused by reflected light falling upon the photoelectric cell. A source of electromotive force 29, as one or more dry cell batteries, provides current for this circuit. A switch 43, which is a double pole switch, closes this circuit and also a circuit 37 for passage of current to light bulb 35. This latter circuit includes a source of electromotive force 39, a rheostat 41 and the switch 43. Thus, upon closing the double pole switch 43, both circuits are energized and the instrument is in operation.

The photoelectric cell 23 can be a conventional selenium cell which, as is well known, transmits current in proportion to the intensity of light reaching a body of selenium. Such selenium or photoelectric cells are available from apparatus supply houses.

Figure 3:
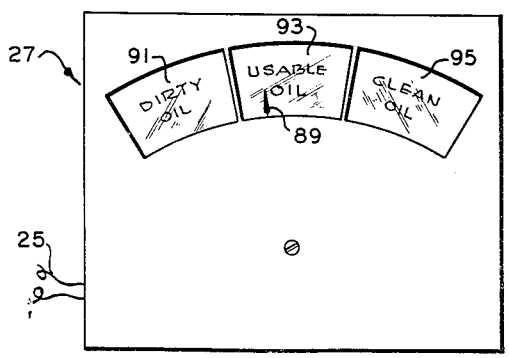
FIGURE 3 is an enlarged view of a portion of the apparatus of FIGURES 1 and 2.

In FIGURE 3 is illustrated a milliammeter such as is suitable for use with the apparatus of FIGURE 1. The ammeter is preferably constructed so that when needle or indicator 89 points toward the portion of the scale marked "Clean Oil," the reflection of light by a spot of clean oil 105 on absorbent paper 99 represents new or unused oil. When using an absorbent paper with a spot of clean oil below opening 18, if the ammeter needle does not indicate "Clean Oil," rheostat 41 is adjusted so that the intensity of the beam of light from the light bulb 35 is altered so that the needle will indicate clean oil. Then, upon insertion of an absorbent paper 97, on which has been placed a drop of dirty oil, in box 11 between the hinged plate 19 and the fixed plate 17, the needle will point to the area of the scale 91 which indicates "Dirty Oil."

If the amount of dirt or solid matter in the oil is slight, the oil is considered suitable for further use if the amount of light reflected by the spot of oil and solid matter 103 moves the needle to the area marked "Usable Oil." The oil ring 101 around spot 103 is produced by capillary movement of the liquid portion of the oil radially from the point at which the oil was dropped on the paper.

Figure 4:
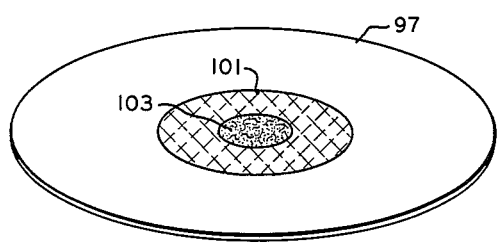
FIGURE 4 illustrates a test specimen of used oil on a sheet of absorbent paper.
Figure 5:
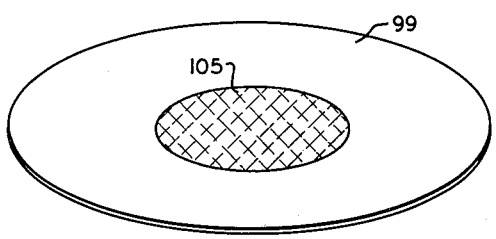
FIGURE 5 illustrates the presence of a new and unused oil on a piece of absorbent paper.

In FIGURE 4, as mentioned, there is illustrated an absorbent paper upon which has been placed a drop of dirty oil. The papers used for this testing of oil can be ordinary pieces of laboratory or chemical filter paper. Inexpensive, quantitative grade of paper is satisfactory. Upon dropping a drop of dirty oil upon such a filter paper, the oil constituent of the drop will flow outward and wet the paper while the solid material will remain as a dark spot at the point at which the oil drop first touched the paper. Thus, upon placing the same volume of oil on the filter paper, an oil which contains a small amount of solid matter will darken the paper to a lesser extent than the solid matter from a drop of oil which contains a large amount of solid matter. The particles remaining in spot 103 from an oil containing a small amount of solid matter will be relatively widely separated from one another in comparison to the particles of solid matter from an oil which contains a large amount of solids. Thus, this former oil will permit reflection of a greater amount of light than the latter oil.

Figure 2:
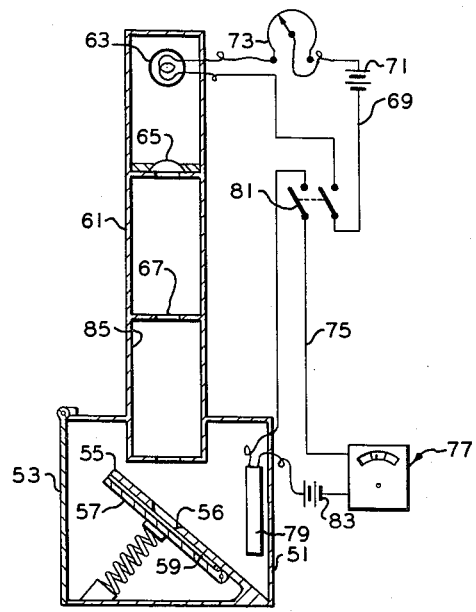
FIGURE 2 illustrates, diagrammatically, and partly in section, another embodiment of the apparatus of this invention.

In FIGURE 2 the apparatus is more or less similar to that illustrated in FIGURE 1, the difference being that a collimating lens is employed for providing a collimated beam of light rather than a beam of approximately collimated light, as in FIGURE 1. In a box 51 is a fixed plate 55, disposed at an angle of approximately 45° with the beam of collimated light so that the reflected light passes approximately horizontally from opening 56 to a photoelectric cell 79. It will be noted that in FIGURE 2 the photoelectric cell is not an annular cell having a central opening.

Other portions of this apparatus are quite similar to those of FIGURE 1 and include a box 51 having a column or extension 61, in the far end of which is positioned electric light bulb 63. A spring loaded pressure plate 57 is provided for tightly holding a test paper 59 against the underside of the fixed plate 55. A spring loaded hinged door 53 is provided for access to the interior of box 51 for removal of a used test paper and insertion of a new one. Photoelectric cell 79 is connected by way of an electrical circuit 75 to a source of electromotive force 83, an ammeter 77 and one blade of a double pole switch 81. The other blade of switch 81, a source of E.M.F. 71 and a rheostat 73 are included in an electrical circuit 69, as illustrated. The ammeter 77 can be similar in all respects to ammeter 27, if desired. The double pole switch 81 is intended to close both circuits so as to make the apparatus fully operative at the same time. Rheostat 73 is provided for adjusting the intensity of electric current to light bulb 63 for calibration of the meter 77 in the manner explained in the calibration of ammeter 27.

It is preferable that the sources of electromotive force 39 and 71 be batteries, for example, dry cell batteries, so that these embodiments of apparatus will be fully portable and can be carried from place to place. The source of electromotive force 29 and 83 are likewise preferably dry cell batteries. The interior of the box 51 and of the column 61 are blackened in the same manner as stated relative to FIGURE 1 so as to eliminate all undesired light reflection. In addition to the use of collimating lens 65, openings 67 are provided for cutting out all light rays expecting those passing along the axis of the column 61.

While certain embodiments of the invention have been described for illustrative purposes, the invention obviously is not limited thereto.

We claim:
1. A device for estimating the load of solid impurities in internal combustion engine crankcase oil comprising, in combination, a light-tight housing, a source of light in said housing, means connected with said source of light for regulating its intensity, means mounted in said housing for collimating a beam of incident light from said source, a plate mounted in the path of said beam of light, said plate being rigidly fixed on the side of said means for collimating opposite said source of light, an opening in said plate, said opening, said means for collimating and said source of light being disposed along a common axis, one side of said plate facing said source of light, a spring loaded hinged plate mounted on the side of the fixed plate opposite said source of light, said hinged plate being positioned to bear one surface against the adjacent surface of said fixed plate, the opening in said fixed plate being of approximately the diameter of a spot comprising solid impurities from a predetermined number of drops of a used internal combustion engine crankcase oil on an absorbent paper, a photoelectric cell mounted in said housing in the path of light reflected from said absorbent paper mounted between said plates, a source of electromotive force, means for detecting flow of electric current, an electrical circuit including said photoelectric cell, said source of electromotive force and said means for detecting flow of electric current.

2. In the device of claim 1, wherein said plates are positioned normal to said beam of light, said photoelectric cell being annular in shape with an opening through its center, and said cell being positioned in said housing intermediate said means for collimating and said plates.

3. In the device of claim 1 wherein said plates are positioned at an angle of about 45° from said beam of light.

References Cited in the file of this patent
UNITED STATES PATENTS

| | | |
|---|---|---|
| 1,854,143 | John | Apr. 12, 1932 |
| 1,967,583 | McFarlane et al. | July 24, 1934 |
| 2,060,957 | Tarvin et al. | Nov. 17, 1936 |
| 2,302,224 | Jones | Nov. 17, 1942 |
| 2,311,101 | Tuttle et al. | Feb. 16, 1943 |
| 2,542,299 | Archer et al. | Feb. 20, 1951 |
| 2,578,722 | McCartney et al. | Dec. 18, 1951 |

OTHER REFERENCES

An article "The Measurement of Gloss," Wetlaufer et al., in Industrial and Engineering Chemistry, vol. 12, pages 647 to 652, Nov. 15, 1940; page 648 cited. (Copy in U.S. Patent Office Library.)